(12) United States Patent
Austin et al.

(10) Patent No.: US 12,230,131 B2
(45) Date of Patent: Feb. 18, 2025

(54) METHOD AND SYSTEM FOR NAVIGATING A VEHICLE AT INTERSECTIONS

(71) Applicant: SAFELIGHT CORP, Hopkinsville, KY (US)

(72) Inventors: Calil Austin, Hopkinsville, KY (US); Diante Hall, Hopkinsville, KY (US)

(73) Assignee: Safelight Corp, Hopkinsville, KY (US)

( * ) Notice: Subject to any disclaimer, the term of this patent is extended or adjusted under 35 U.S.C. 154(b) by 0 days.

(21) Appl. No.: 17/768,789

(22) PCT Filed: Nov. 4, 2020

(86) PCT No.: PCT/US2020/058783
§ 371 (c)(1),
(2) Date: Apr. 13, 2022

(87) PCT Pub. No.: WO2021/091941
PCT Pub. Date: May 14, 2021

(65) Prior Publication Data
US 2024/0005787 A1  Jan. 4, 2024

Related U.S. Application Data

(60) Provisional application No. 62/933,030, filed on Nov. 8, 2019.

(51) Int. Cl.
*G08G 1/095* (2006.01)
*B60R 1/12* (2006.01)
(Continued)

(52) U.S. Cl.
CPC .............. *G08G 1/095* (2013.01); *B60R 1/12* (2013.01); *G08G 1/0967* (2013.01); *H04W 4/024* (2018.02); *B60R 2001/1215* (2013.01)

(58) Field of Classification Search
CPC ....... B60W 2555/60; B60W 30/18154; B60W 2556/20; B60R 2001/1215; B60R 1/12; G08G 1/00; G08G 1/096725
See application file for complete search history.

(56) References Cited

U.S. PATENT DOCUMENTS

2016/0335888 A1* 11/2016 Tian .................... G08G 1/081
2016/0379490 A1  12/2016 Simanowski et al.
(Continued)

FOREIGN PATENT DOCUMENTS

DE  102017220975 A1 *  5/2019  .............. B60R 1/04
JP  2003329468 A  *  11/2003

*Primary Examiner* — Khoi H Tran
*Assistant Examiner* — Dairon Estevez
(74) *Attorney, Agent, or Firm* — Martin IP Law Group; C. Richard Martin

(57) ABSTRACT

Various embodiments of the invention provide a method, and a system for providing a seamless traffic control to users for navigating intersections, when traffic signals are malfunctioning. The method includes monitoring conditions, such as weather conditions, or power outages of an area. The monitored conditions are used to determine malfunctioning traffic signals of the area. The method further includes defining a geo-fence for each malfunctioning traffic signal intersection. An entrance of a vehicle or a commuter is identified, when the vehicle enters the geo-fence. When the vehicle is identified, traffic signals are projected corresponding to lane structure of the intersection. The traffic signals may be projected along with a textual indication on a display device of the vehicle to provide safe navigation assistance to the vehicle across the malfunctioning intersection.

19 Claims, 15 Drawing Sheets

(51) Int. Cl.
  *G08G 1/0967* (2006.01)
  *H04W 4/024* (2018.01)

(56) References Cited

U.S. PATENT DOCUMENTS

| | | | |
|---|---|---|---|
| 2017/0045367 A1* | 2/2017 | Park | G01C 21/3697 |
| 2018/0122227 A1* | 5/2018 | Mubarek | G08G 1/0133 |
| 2018/0262865 A1* | 9/2018 | Lepp | G08G 1/166 |
| 2019/0012912 A1* | 1/2019 | Kim | B60K 35/80 |
| 2019/0174276 A1 | 6/2019 | Mineiro Ramos De Azevedo | |
| 2019/0315368 A1 | 10/2019 | Shen et al. | |
| 2019/0389471 A1* | 12/2019 | Leekin | B60W 30/181 |
| 2020/0242922 A1* | 7/2020 | Dulberg | G08G 1/166 |
| 2021/0097311 A1* | 4/2021 | McBeth | B60W 30/09 |

* cited by examiner

METHOD AND SYSTEM FOR NAVIGATING A VEHICLE AT INTERSECTIONS

TECHNOLOGICAL FIELD

Example embodiments of the present invention generally relate to navigation systems and more particularly relate to a method and a system for navigating a vehicle at road intersections.

BACKGROUND

Generally, traffic signals are deployed in a road junction area, such as an intersection of a plurality of road segments. The traffic signals at the intersection are a basic requirement for ensuring safe navigation of vehicles. However, these traffic signals may malfunction in various scenarios such as natural calamities, adverse weather conditions, power outages or any other condition, such as malfunctioning with activation and deactivation of the traffic signals or software glitches. In such scenarios, human intervention may be required for recovering the affected traffic signals.

However, timely human intervention may be delayed due to the affected roadways. This may delay the recovery of the affected traffic signals due to which commute across the intersection may be hindered. The recovery of the affected traffic signals may require live updates, and any other necessary adjustments or changes that facilitate the need of human interaction/control. Consequently, the malfunctioning of the traffic signals may entail unwanted situations, such as vehicle accidents, time delays, traffic congestion in road networks, and/or the like. It may be a challenging task for road users to safely navigate vehicles at any intersection affected by the malfunctioning of traffic signals.

Therefore, there is a need to provide a solution to overcome the above-mentioned challenges. More specifically, there is need to fulfill the gap in an efficient and feasible manner, while reducing manual intervention in recovering the affected traffic signal.

SUMMARY

Various embodiments are provided for navigating a vehicle at intersections. As used herein, the intersections may be a three-way traffic intersection, a four-way traffic intersection, a bridge intersection, a highway intersection or the like. In many example scenarios, one or more traffic signals at an intersection may be malfunctioning. For example, in some instances, the traffic signals may not be operating at the intersection due to failure or fault in the traffic signals. In some other instances, adverse weather conditions may cause power outage in an area or damage to the power supply of the traffic signals. Various embodiments are provided for identifying the intersections in the area with malfunctioning traffic signals. In some example embodiments, weather conditions and power outages of an area are monitored. The weather conditions, the power outages or any data that contribute to malfunctioning of the traffic signals may be tracked for providing solutions to mitigate any problem arising out of the malfunctioning of the traffic signals. Further, solutions are provided for overcoming challenges faced due to the malfunctioning of traffic signals.

Various embodiments are provided for defining geofences, such as virtual coordinates associated with each of the intersections. In various embodiments, the coordinates associated with the intersection may be used for providing a coverage range or extent of the intersection. In some embodiments, the range may be a threshold distance (i.e., a distance from the location of the intersection to the virtual coordinates associated with the intersection) for each road segment of the intersection.

Various embodiments provide traffic signal information to users or vehicles that are commuting at a malfunctioning traffic signal intersection. For example, when a vehicle is within the range of the intersection, a notification may be provided to the user. The notification may include a message corresponding to an activation of a system for projection of traffic signals. Further, the notification may include a message indicating a status of current traffic signal at the intersection.

According to one aspect of the present invention, there is provided a system for navigating a vehicle at a location comprising a geofence extending a distance outwardly from the location; an electronic device associated with the vehicle; a system for providing navigation assistance to said electronic device; and a network connecting said system to said electronic device. The electronic device further comprises a processor communicably coupled with a memory; a communication interface for projecting traffic signal information provided by the system and for transmitting and receiving location and speed data; and a sensor for capturing location data and speed, the sensor being communicably coupled to the processor and the communication interface.

The location may be an intersection with a malfunctioning traffic signal. The electronic device may be integrated within the vehicle, or it may be a handheld mobile device selected from a group consisting of a smartphone, a tablet, a phablet, and a wearable device. A display of the electronic device may be integrated into the rearview mirror of the vehicle. The system for providing navigation assistance may include a navigation application that is installed on the electronic device. The navigation application may provide communication between a plurality of vehicles carrying the electronic device.

The network may be associated with an application layer for implementation of communication protocols based on one or more communication requests from at least one of the one or more communication devices, and communication data is transmitted or received via the communication protocols. The communication protocols are wired or wireless, and are selected from a group consisting of Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The network may be a wireless channel, a wired channel, or a combination of wireless and wired channel. The system for navigating a vehicle according to claim 11 wherein the wireless or wired channel may be associated with a network standard selected from a group consisting of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN).

The communication interface includes a display screen upon which virtual traffic signals corresponding to lanes of traffic at the intersection are displayed. A power saving mode may be provided wherein the electronic device remains in low power mode until it enters into the geofence, at which time it enters full power mode. The display may comprise a split-screen wherein live traffic data is displayed on a first section of the screen and traffic signal data is provided on a second section of the screen.

According to a further aspect of the invention, there is provided a method for navigating a vehicle in an area having one or more intersections including the steps of: monitoring conditions in the area at the one or more intersections; identifying a malfunctioning traffic signal at a one of the one or more intersections based on the monitored condition; defining a geofence in the area of the identified malfunctioning traffic signal; and providing traffic signals on a display screen of an electronic device in a vehicle when the vehicle enters the geofence.

The step of monitoring conditions in the area of the intersection may include monitoring weather conditions and power outages, and may further include collecting crowd-sourced traffic data. The step of defining a geofence may include providing a coverage range of the traffic signal intersection along with the functionality of navigating universal vehicles for a time interval. The coverage range may be a virtual circle with location of the intersection at a center of the circle and a radius based on a threshold distance from the center.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details.

Throughout the following description, numerous references may be made regarding servers, services, or other systems formed from computing devices. It should be appreciated that the use of such terms is deemed to represent one or more computing devices having at least one processor configured to or programmed to execute software instructions stored on a computer readable tangible, non-transitory medium or also referred to as a processor readable medium. For example, a server can include one or more computers operating as a web server, data source server, or other type of computer server in a manner to fulfill described roles, responsibilities, or functions. Within the context of this document, the disclosed modules are also deemed to comprise computing devices having a processor and a non-transitory memory storing instructions executable by the processor that cause the device to control, manage, or otherwise manipulate the features of the devices or systems.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Figure 1:
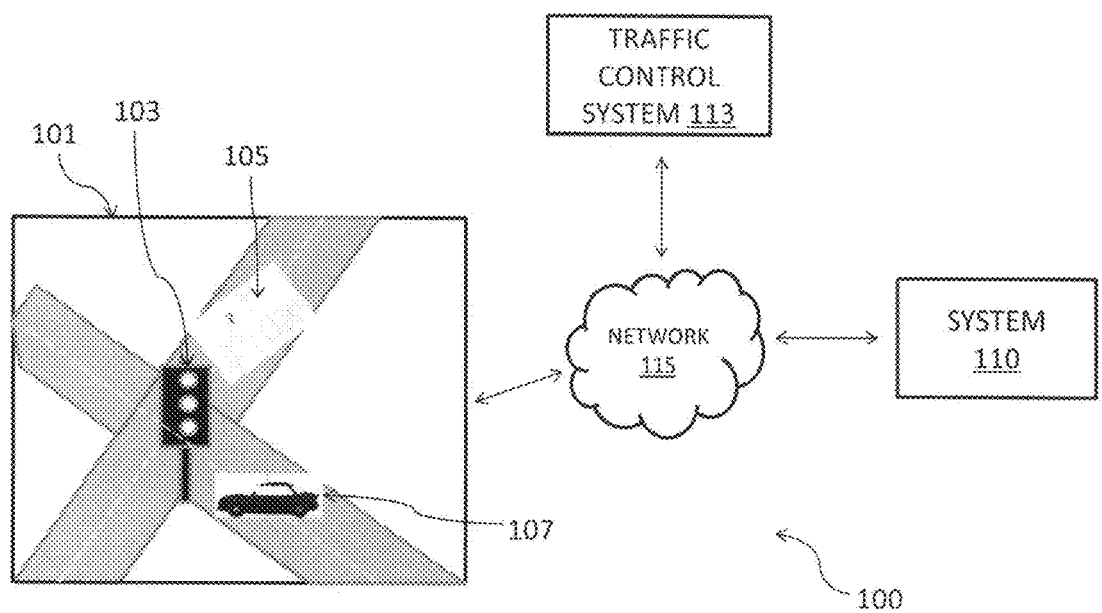
FIG. 1 illustrates an environment representation for providing safe navigation at an intersection, in accordance with an example embodiment.

FIG. 1 illustrates an environment representation 100 for providing safe navigation at an intersection 101, in accordance with an example embodiment. The intersection 101 may have a traffic signal, such as traffic signal 103. Although the intersection 101 shown in FIG. 1 is a 4-way intersection, it may be contemplated that within the scope of this disclosure, it may be an intersection of more or less than the intersection described herein. In one example scenario, the intersection 101 may be affected by a severe weather condition, such as thunderstorm, snow, or cyclone. The traffic signal 103 may be malfunctioning due to the severe weather condition. For instance, the traffic signal 103 may be unable to operate due to power outage. Additionally, or alternately, the damage may cause software glitches due to which the traffic signal 103 may generate wrong indication to the users, such as a vehicle 105 and a vehicle 107. The traffic signal 103 may be controlled and managed in an automated manner by a remote system, such as a traffic control system 113. The traffic control system 113 may control the traffic signal 103 based on conditions, such as road conditions, weather conditions, etc. The traffic control system 113 may be associated with an organization, such as a city's transportation department which may collect and measure the conditions based on information from various sources. For instance, the traffic control system 113 may be connected to monitoring devices deployed at various locations for gathering the information from the various sources that are pertaining to the traffic conditions.

The environment 100 includes a system 110 for providing navigation assistance to the users, such as the vehicle 105 and the vehicle 107, when there is a malfunction in traffic signals at one or more intersections. In one example embodiment, the system 110 may be embodied in a cloud based server (not shown). In another example embodiment, the system 110 may be embodied in any suitable electronic device associated with a user. As used herein, the term 'user' may refer to a vehicle operator, a rider, or a driver of the vehicle or the vehicle itself. The electronic device may be but not limited to a smartphone, a tablet, a phablet, a wearable device or an electronic device associated with the vehicle. Further, the electronic device may be integrated within the vehicle. In various embodiments, the vehicle may be an autonomous vehicle, semiautonomous vehicle, or a manually-operated vehicle. In an illustrative example scenario, the vehicle 105 and the vehicle 107 are a two-wheeler vehicle and a four-wheeler vehicle, respectively. The vehicle 105 is driven by a rider 109. The rider 109 may be associated with an electronic device, such as an electronic device 111. The electronic device 111 is mounted on the vehicle 105 in such a way that the electronic device 111 falls on line of sight of the rider 109.

The system 110 may host an application, such as a navigation application that may installed in the electronic device 111 (not shown in FIG. 1). In one example, the rider 109 may download the application from an online application store. The rider 109 may access the application after creating an account using information, such as a user name, insurance policy number and an individually created password. The application may also be used by any pedestrian for safe navigation during adverse situations. In another example, the application may be a built-in navigation application in the vehicle 107. Moreover, the application provides communication between the vehicles, such as the vehicle 105 and the vehicle 107 and the system 110 using a communication network, such as a network 115.

The network 115 may comprise suitable logic, circuitry, and interfaces that may be configured to provide a plurality of network ports and a plurality of communication channels for transmission and reception of data. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 115 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 115 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

Initially, the system monitors live streaming data that aid in inferring affected areas or malfunctioning traffic signal. In an example embodiment, the system 110 collects live regional weather data as well as power outage data per region, such as region of the intersection 101. The live regional weather data and the power outage data may be obtained from the traffic control system 113. The system 110 may also collect the data from other sources, such as crowd-sourced traffic data. The collected traffic related data may be stored in a database (not shown in FIG. 1). The database may be embodied within the system 110 or may be associated with the system 110. The system 110 then determines malfunctioning traffic signals, such as the traffic signal 103 based on the live regional weather and the power outage data.

After determining the malfunctioning traffic signal, the system 110 defines a geo-fence of an area associated with each affected traffic signal intersection. The geo-fence may be defined by creating virtual coordinates that measure around a traffic signal intersection. The system 110 provides coverage of the traffic signal intersection based on geo-location information of the traffic signal. For instance, wideband coverage may be provided that surrounds multiple close distance traffic intersections throughout an area. The coverage is provided with a functionality of navigating vehicles through intersections for a time interval, such as 1 minute and 20 seconds. This provides an efficient simultaneous intersectional lane change with intersections that have 3-way or 4-way intersection lanes. There may be a 30 seconds light change time interval in each lane, in each of the intersection.

When the vehicles, such as the vehicle 105 and the vehicle 107 enter the geo-fence of the traffic signal 103, the application of the vehicle 105 and the vehicle 107 is activated. For example, the intersection 101 is an activated area, where the system 110 is active. When the vehicles 105 and 107 are at 800 ft-1000 ft from the activated area, then the vehicles 105 and 107 are activated. The system 110 prepares to project traffic signals via the application as the vehicles 105 and 107 approach the intersection 101. The application communicates with the system 110 via the network 115.

Further, the system 110 may automatically record live intersection traffic data during the activation. The live recording of the intersection traffic data captures location of each vehicle's position as well as speed of each vehicle throughout the process of the intersection commute. The live recorded data may be stored in the electronic device for a pre-defined amount of time and may be pulled from the electronic device for purposes, such as insurance/accident claims or investigation. The live recorded data is auto-deleted when not pulled within the pre-defined amount of time.

After the activation, the traffic signals are locally displayed at the vehicle 105 and the vehicle 107. For instance, the traffic signals are displayed at the electronic device 111 using the application. The rider 109 follows the traffic signals and navigates accordingly. The application may include a map to allow riders, e.g., the rider 109 to be viewed prior to going through the affected intersection, such as the intersection 101. The vehicle 107 perceives the traffic signals and accordingly triggers control of the vehicle 107. Further, the application tracks location of each vehicle's position and speed of each vehicle when the vehicles commute the intersection 101. When the vehicle 105 exits the geo-fence, the application becomes inactive. This enables the electronic device 111 to remain in a low-power energy mode for energy efficiency. Moreover, to allow the rider 109 to have more focus on the road, an audio output may be provided to the rider 109. The low-energy power mode is switched to full power mode, when the vehicle 105 enters a geo-fence of next intersection.

Various example embodiments of the present disclosure enable projection of traffic signals along with a traffic signal change/variation timer on any display screen that falls within the line of sight of a rider or a driver. Some non-limiting examples of the display screen include a rear-view mirror device, a vehicle onboard device, a helmet visor device, a transparent (Organic Light Emitting Diode) OLED windshield device. For example, the display screen may be a windshield of a car, a display screen on an electronic device. In some cases, the traffic signals may be projected as a Virtual Reality (VR), an Augmented Reality (AR) or a combination of both the VR and the AR, i.e., a Mixed Reality (MR) on VR lens. For instance, the VR/AR/MR lens may be embodied in a helmet of the rider 109 or an eye-glass of a user. In some example embodiments, the traffic signal information may be rendered in one or more of an audio-video format or the like. In various embodiments, traffic signals associated with an intersection may be determined based on an area. For example, if the area is a city area, then each lane of the intersection may have a thirty second interval for changing a lane or a road segment (i.e., a green signal for thirty seconds). If the area is a suburban area, each road segment of the intersection may have sixty second interval for changing the road segment (i.e. a green signal for sixty seconds), as intersections in the suburban area may be located faraway. If the area is a railway crossover region and a train (equipped with sensors for indicating its location) is within the range of the railway crossover region (which is an intersection), then the traffic signal will be red (until the train crosses the intersection). If the area is the highway region, then each lane of the intersection will have a varying time interval for changing the road segment. The projection of the traffic signals is further explained in detail with reference to FIGS. 2A to 2B, 3A-3F and 4A-4C.

Figure 2A:
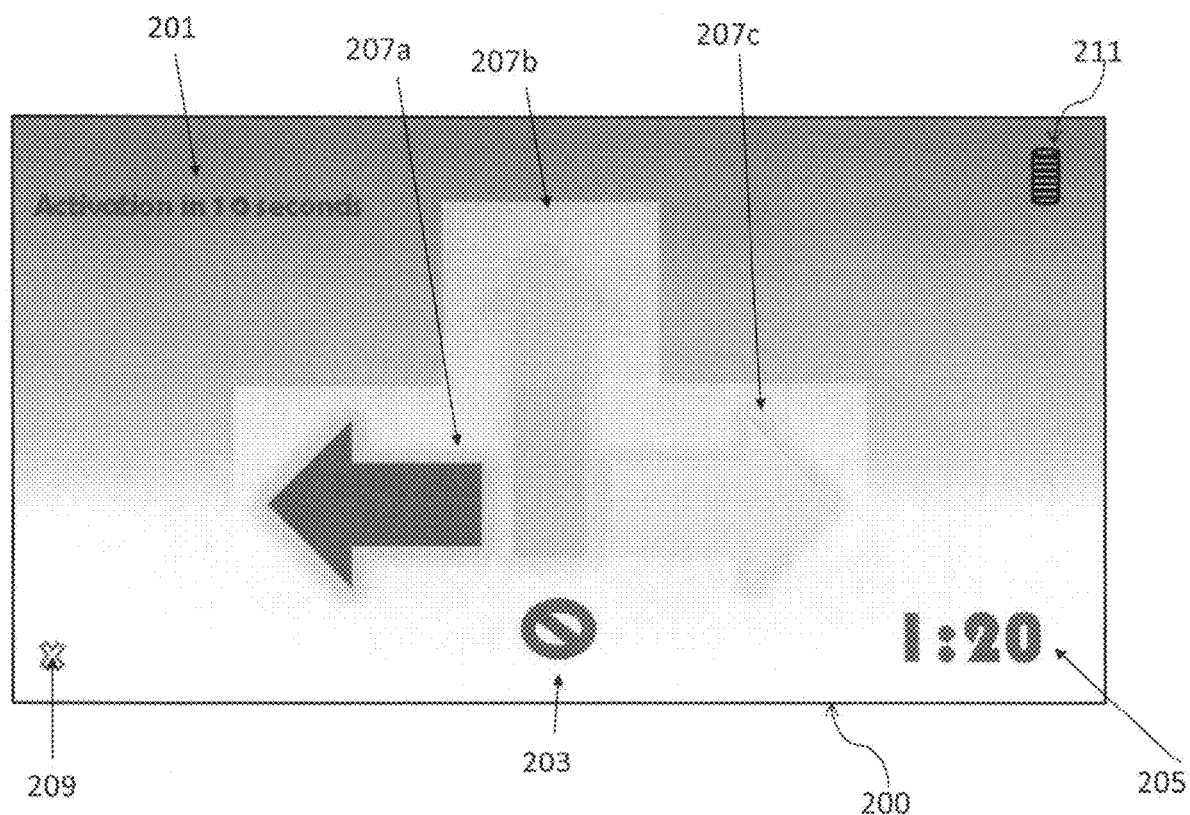
FIG. 2A shows a display screen depicting activation of the system of FIG. 1, in accordance with an example embodiment.

FIG. 2A shows a display screen 200 depicting activation of the system 110 of FIG. 1, in accordance with an example embodiment. The display screen 200 herein is shown for description purpose and can be displayed on a windshield of a vehicle, (e.g., the vehicle 107 of FIG. 1), on an electronic device, (e.g., the electronic device 111 of FIG. 1), on a rear-view mirror of the vehicle 107 or the like. The traffic signals 207 for an intersection, such as the intersection 101 of FIG. 1, is projected based on a lane structure of the intersection 101. The intersection 101 is a 3-way intersection with 3 lanes. Further, the traffic signals 207 is collectively represents traffic signal 207a, traffic signal 207b and traffic signal 207c. Each traffic signal corresponds to each lane of the 3-way intersection 101 and displays traffic signal variations accordingly. For instance, the traffic signal 207a may indicate a red signal for a left lane, the traffic signal 207b may indicate a green signal for a middle lane and the traffic signal 207c may indicate a yellow signal for a right lane. When the vehicle 105 is outside the geo-fence of the intersection 101, power of the electronic device 111 is in a power saving mode. The power saving mode is depicted by power mode status 211, as shown in FIG. 2A. In FIG. 2A, the power mode 211 is in low energy mode as the vehicle 105 is outside the geo-fence. The power mode 211 may be indicated by a color code, for example, green color may indicate that the power mode 211 is in low power mode. In an alternate example embodiment, the power mode 211 may be indicated by a Light-Emitting Diode (LED) indicator.

The movement of a vehicle, such as the vehicle 105 (shown in FIG. 1) is provided to the system 110 by the application in the electronic device 111. When the vehicle 105 approaches towards a geo-fence of the intersection 101, the application triggers the projection of the traffic signals 207. The rider 109 may be notified for an activation of projection of the traffic signals. For example, a notification 201 is displayed on the display screen 200. The notification 201 includes a message along with a timer, such as 'ACTIVATION IN 10 SECONDS'. Further, the display screen 200 includes a status 203 that indicates an inactive state of the system 110 and a time interval 205 for the traffic signals 207 at an intersection. An audio output of the notification 201 and the status 203 may be provided to inform a rider, such as the rider 109. This may help the rider 109 to stay focus, while riding the vehicle 105. The display screen 200 may be closed using a close button, such as a button 209 in the display screen 200.

Figure 2B:
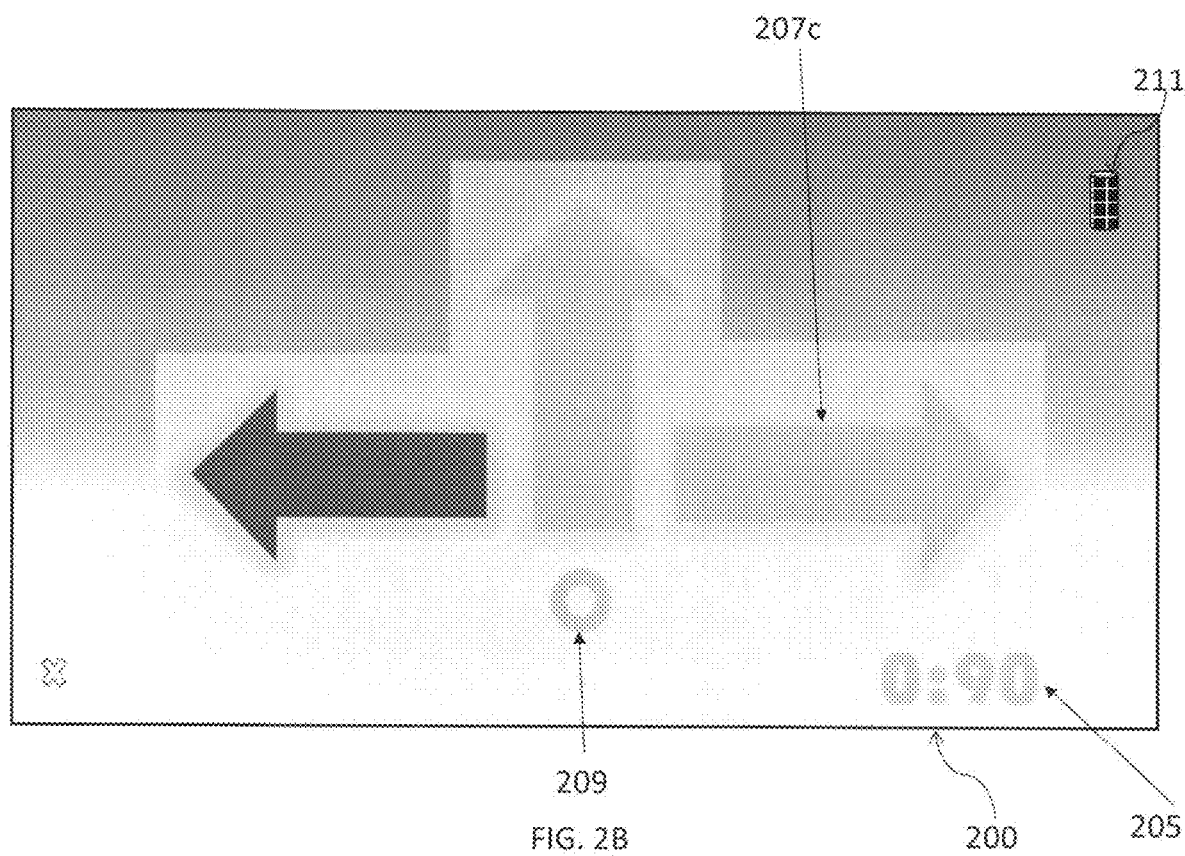
FIG. 2B shows the display screen depicting projection of traffic signals, in accordance with an example embodiment.

When the vehicle 105 enters the geo-fence, the system 110 detects the vehicle 105. Further, when the vehicle 105 is inside the geo-fence, the power mode 211 switches to high power mode. After the detection, the system 110 becomes active and projects the traffic signals 207. The activation of the system 110 is displayed in the display screen 200. The status 203 is changed to an active status 209, which is shown in FIG. 2B. The time interval 205 is also updated according to the traffic signals indicated. The display screen 200 is exemplary and may contain more or less varying contents than those depicted in FIGS. 2A and 2B.

In some cases, the intersection 101 may correspond to a bridge or a flyover bridge intersection. In such cases, traffic signals may be projected based on lane structure of the bridge. The projection of the traffic signals for such intersection is shown and described with reference to FIGS. 3A-3F.

Figure 3A:
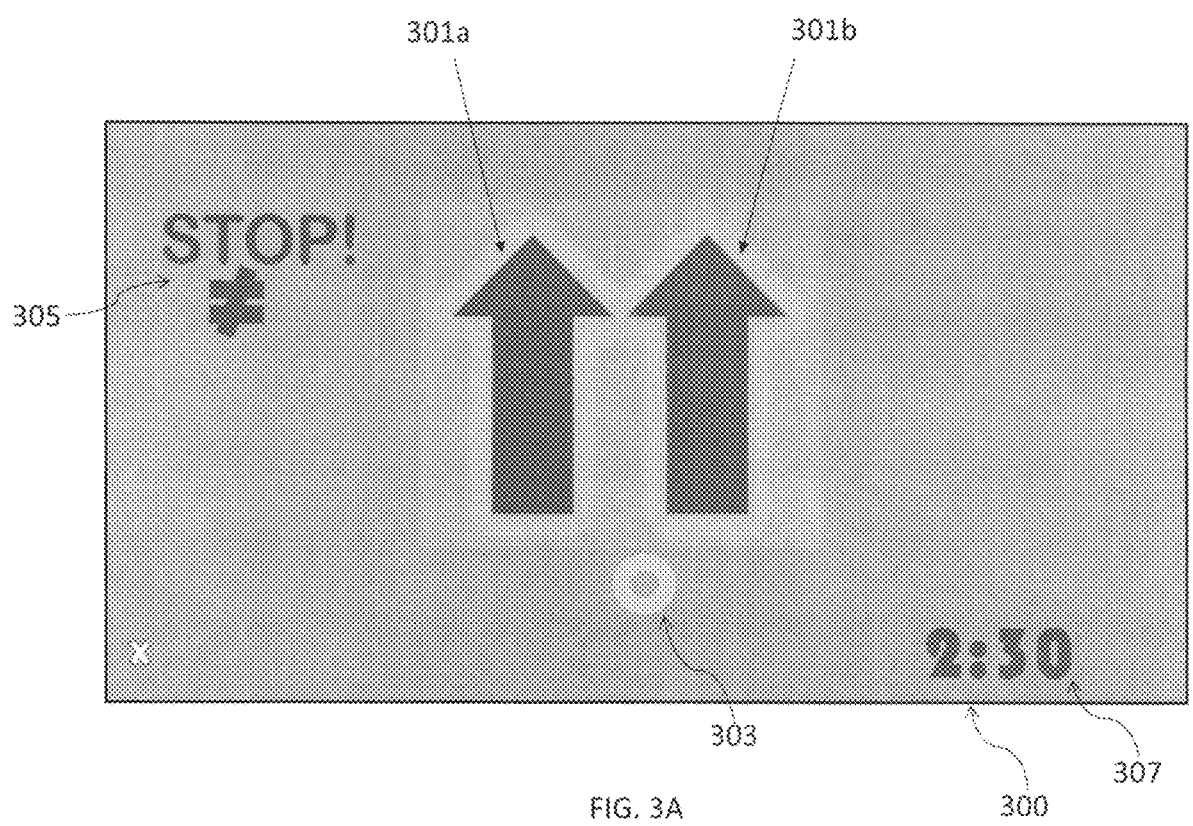
FIGS. 3A-3F, illustrate a display screen depicting a projection of traffic signals for a bridge intersection, in accordance with an example embodiment.

Referring now to FIGS. 3A-3F, a display screen 300 depicting a projection of traffic signals 301 for a bridge intersection is shown, in accordance with an example embodiment. The bridge intersection 301 herein is described as a 2-way bridge intersection for explanation purpose and may be more than the 2-way bridge intersection. The traffic signals 301 is a collective term for at least a traffic signal 301a and a traffic signal 301b. Each traffic signal (i.e., the traffic signal 301a and the traffic signal 301b) may correspond to each lane of the bridge intersection. The display screen 300 includes a status 303 of the system 110, a textual indication 305 of the traffic signals 301a and 301b and a time interval 307 for the traffic signals 301. In FIG. 3A, the traffic signals 301 is indicated as a stop signal for both lanes of the bridge intersection and the textual indication 305 is depicted as 'STOP' with a symbol '≠'.

Figure 3B:
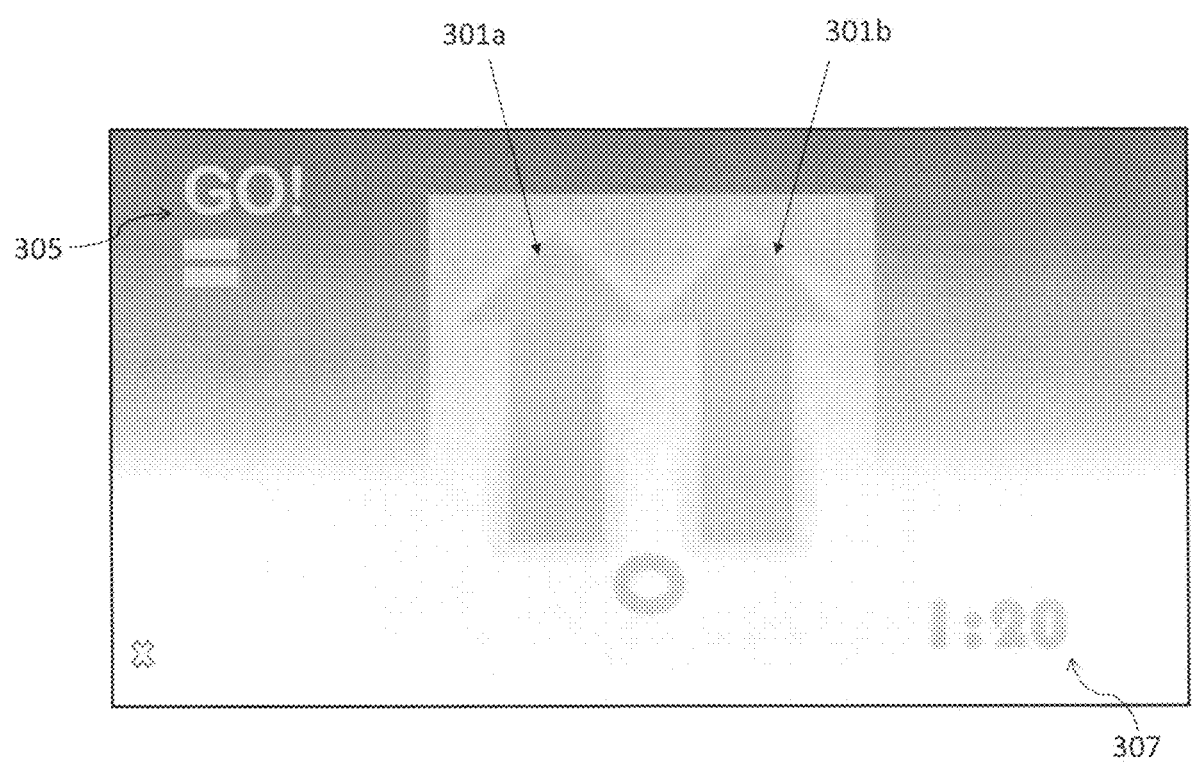

The traffic signals 301a and 301b may be updated after some time. For example, when the time interval 307 is at '1:20', the traffic signals 301 is changed to a green signal. The textual indication 305 is changed to 'GO' with a symbol '='. The updated traffic signals 301 with the updated textual indication 305 according to the updated time interval 307, is shown in FIG. 3B.

Figure 3C:
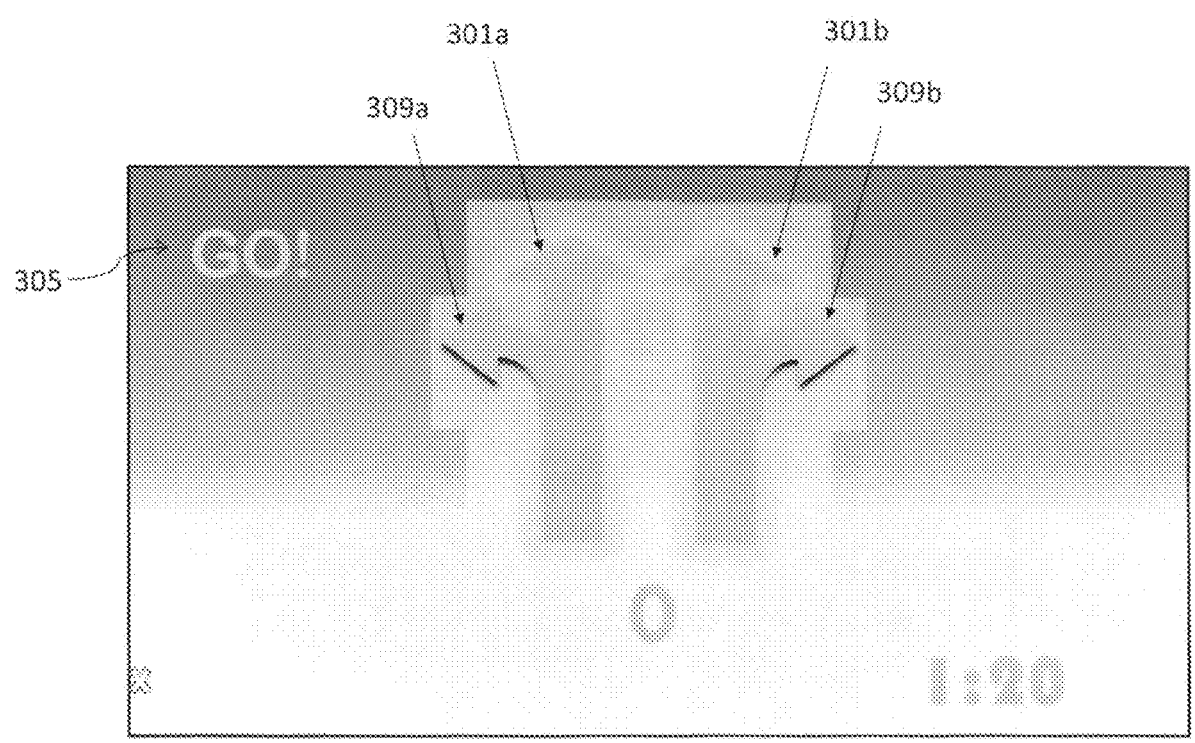
Figure 3D:
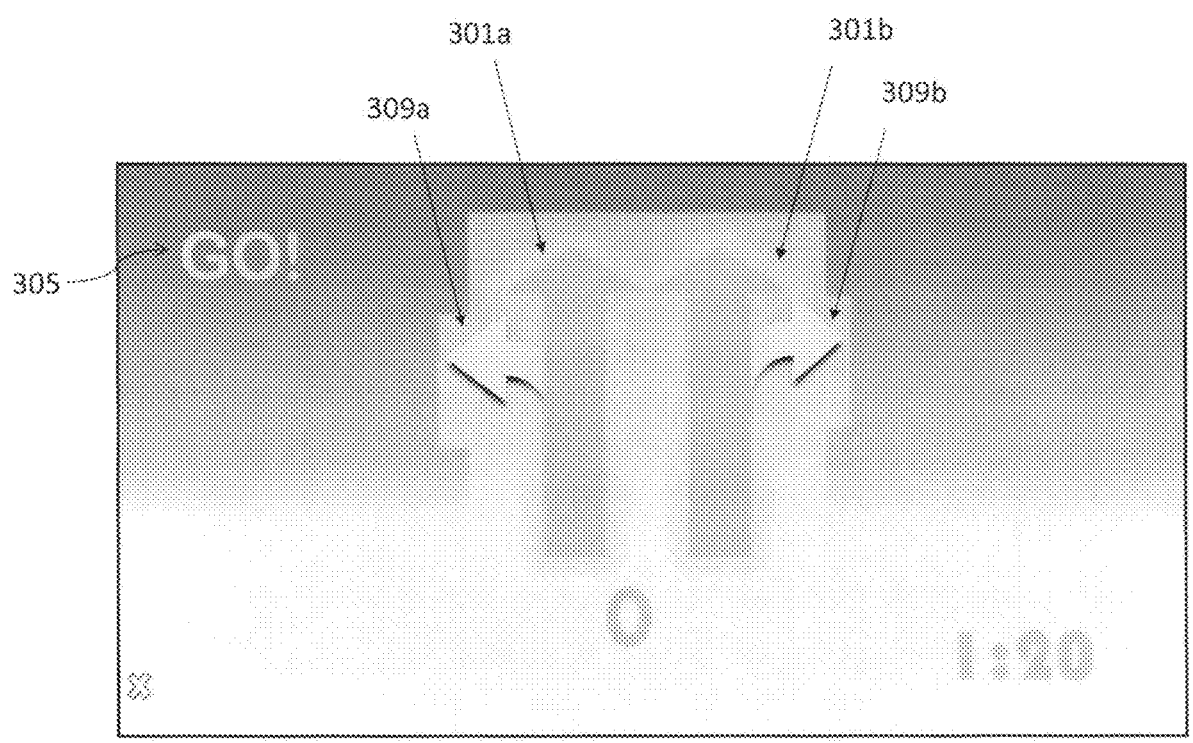
Figure 3E:
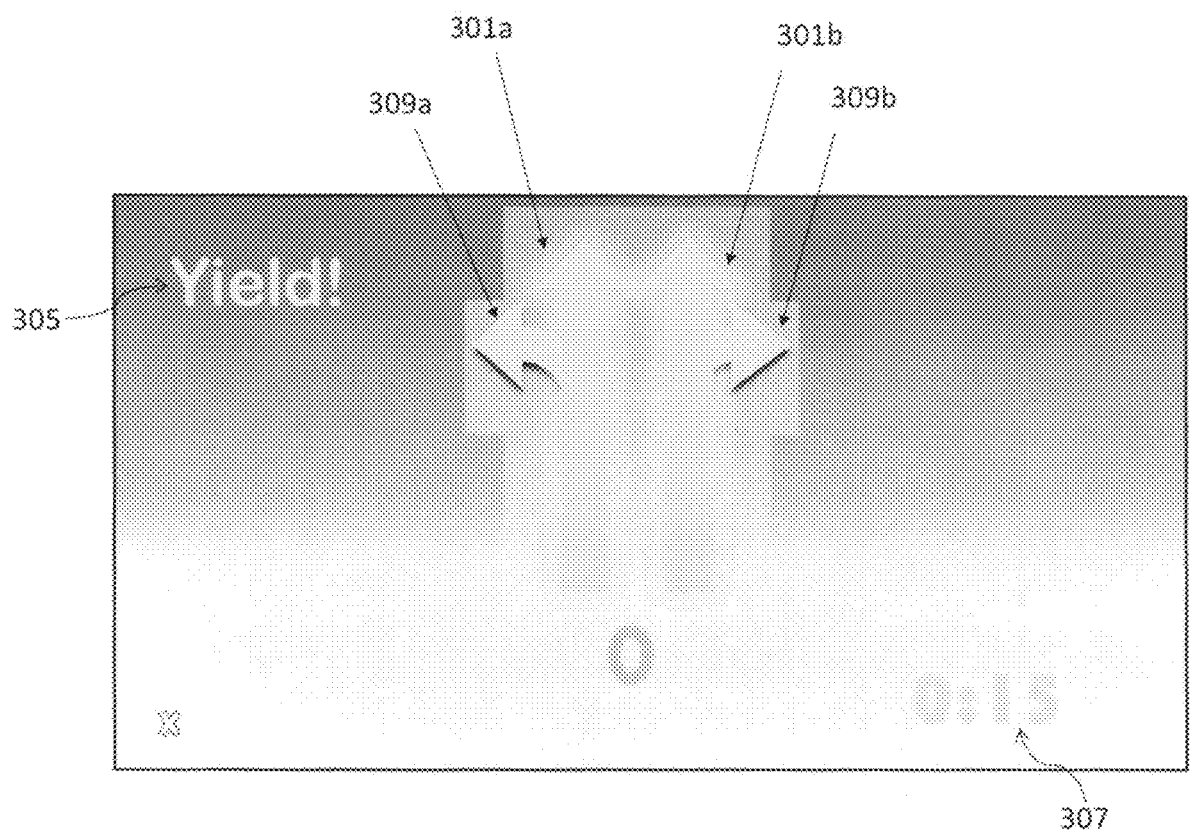
Figure 3F:
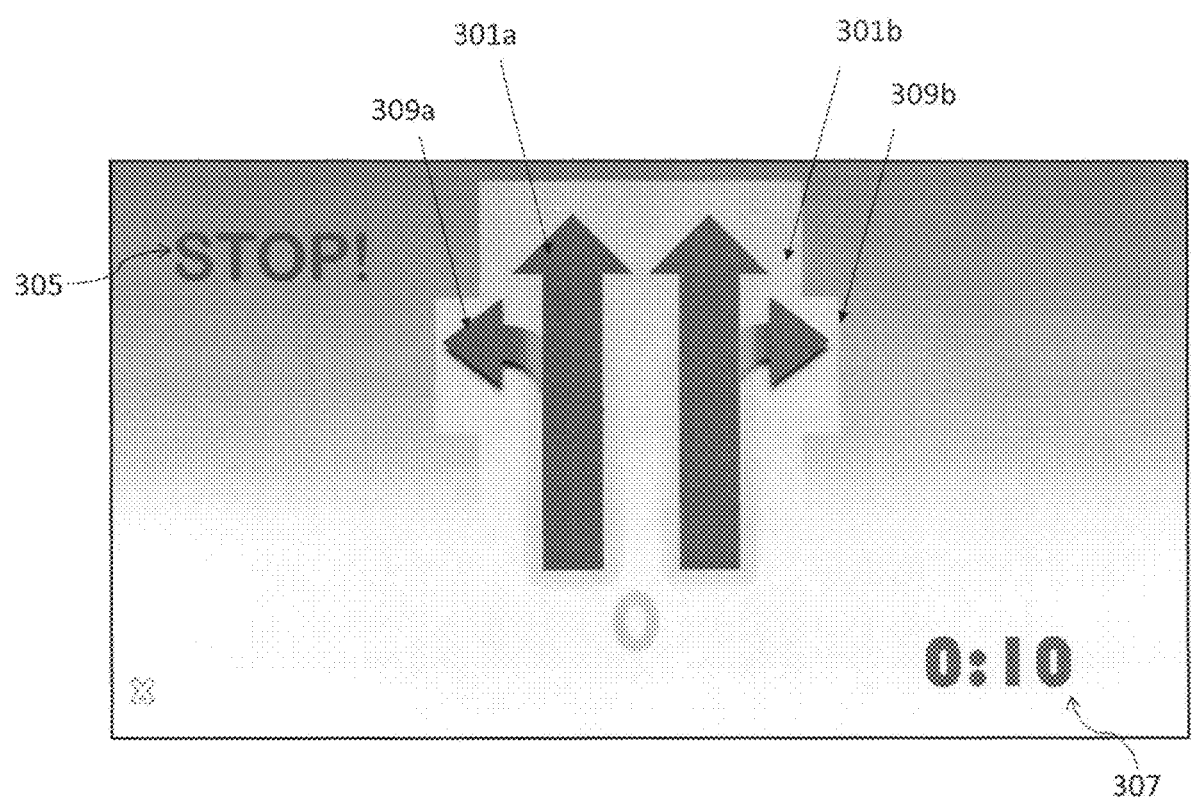

In some case, there may be diversion lanes of the bridge intersection. The system 110 may project traffic signals for such diversion lanes, which is shown in FIG. 3C. For example, a traffic signal 309a corresponds to a left diversion from a first bridge lane and a traffic signal 309b corresponds to a right diversion from a second bridge lane. The textual indication 305 is depicted as 'GO!'. In FIG. 3D, the traffic signals 309a and 309b is changed to a yellow signal. After a pre-defined amount of time, for example, 1 minute and 5 seconds, the traffic signals 301 and 309 are updated. In FIG. 3D, the traffic signals 301a, 301b, 309a and 309b are updated into a yellow signal. The traffic signals 309a and 309b are hereafter collectively referred to as traffic signals 309. The time interval 307 for the traffic signals 301 and 309 is depicted as 15 seconds, as is shown in FIG. 3D. After updating the traffic signals 309a and 309b, The traffic signals 301 and 309 changes to yellow signal, which is shown in FIG. 3E. In FIG. 3E, the time interval 307 is depicted as 15 seconds. The traffic signals 301 and 309 changes into a red signal, as shown in FIG. 3F. In FIG. 3F, the textual indication 305 is depicted as 'STOP' and the time interval 307 is depicted as 10 seconds.

The live intersection traffic signal data may be automatically recorded during activation of the system 110. The projection of the traffic signals for the live intersection traffic signal is further explained with reference to FIGS. 4A-4C.

Figure 4A:
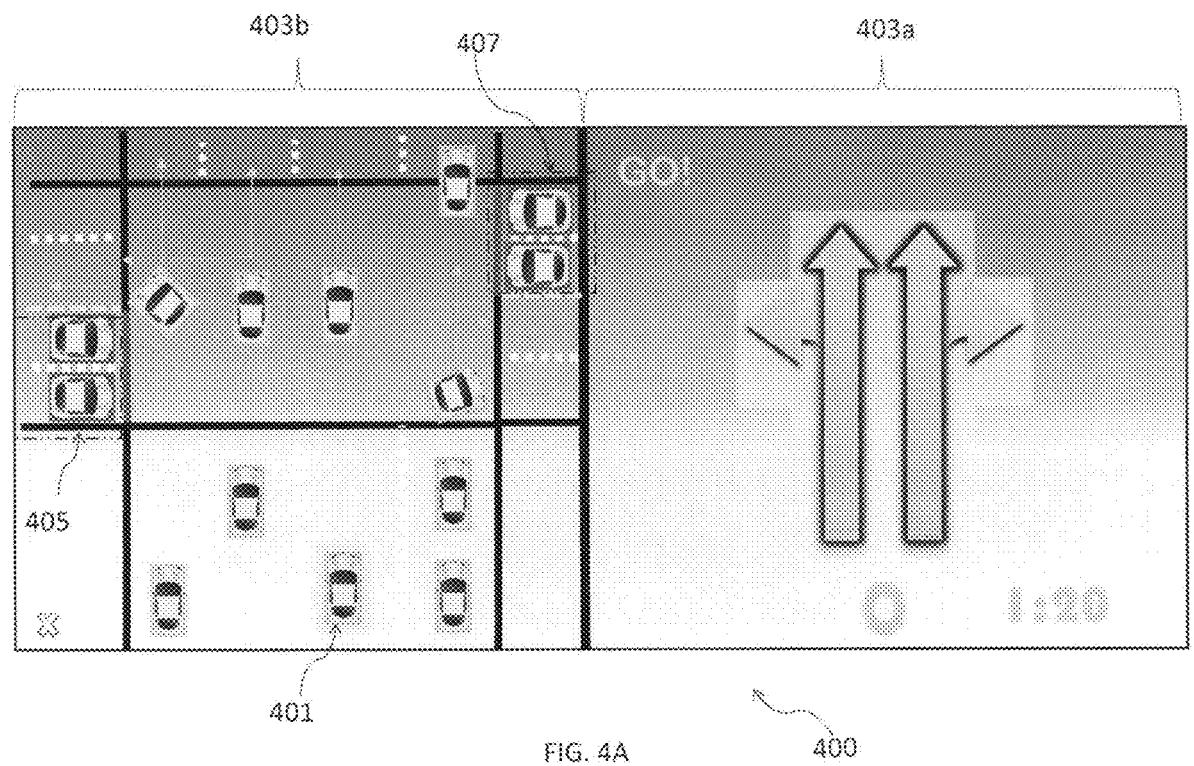
FIGS. 4A-4C illustrate a display screen depicting a projection of live traffic data at an intersection, in accordance with an example embodiment.
Figure 4B:
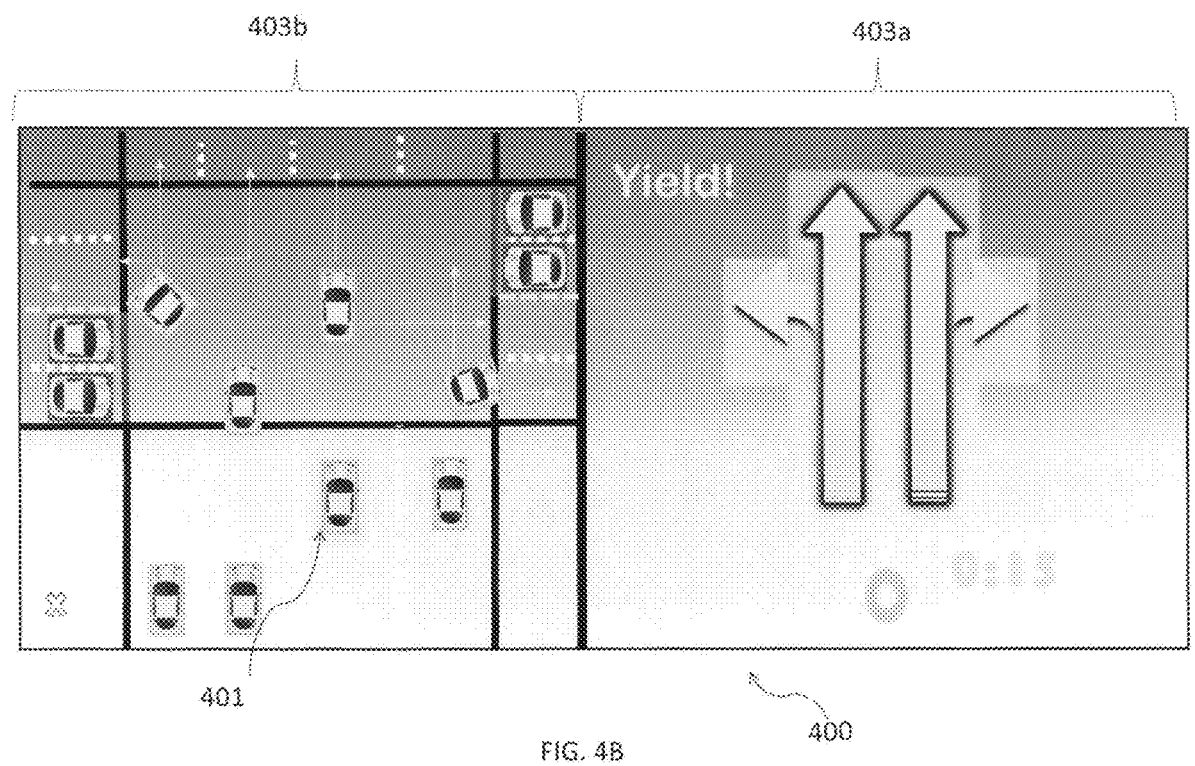
Figure 4C:
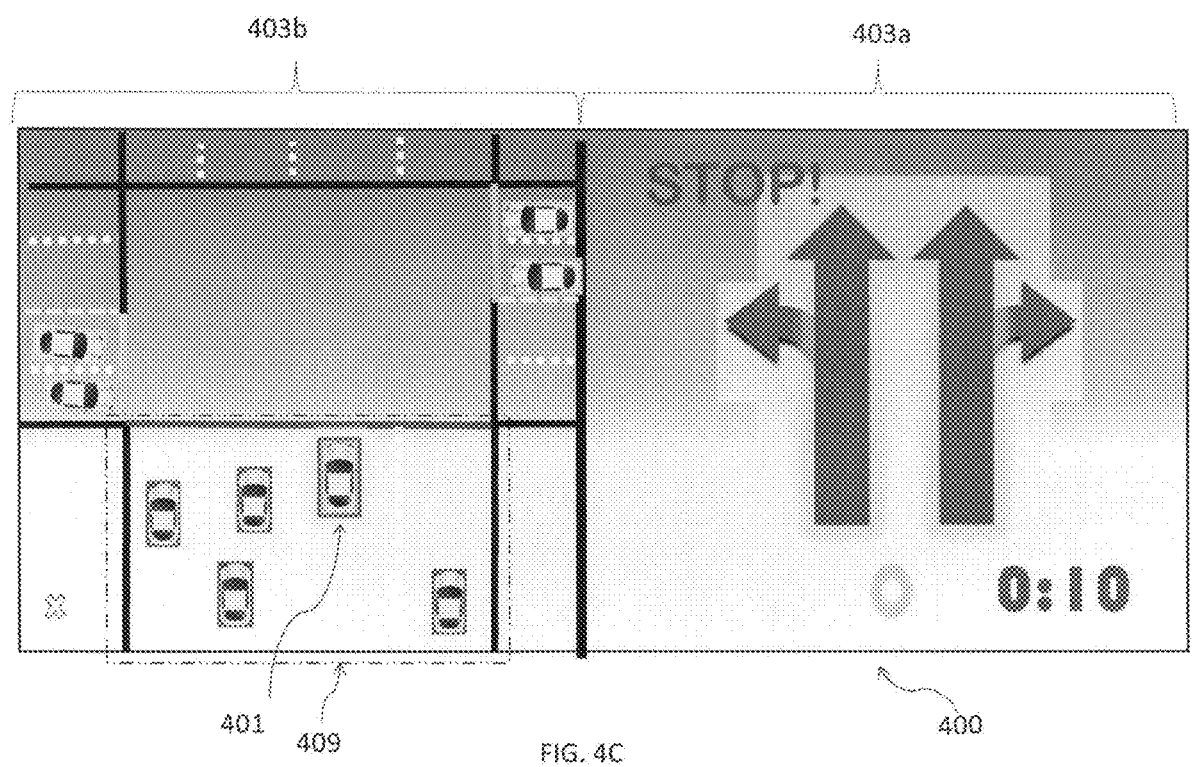

FIGS. 4A-4C illustrate a display screen 400 depicting a projection of live traffic data at an intersection, in accordance with an example embodiment. In an illustrative example scenario, the intersection corresponds to a highway intersection and the display screen 400 is a rear-view mirror of a vehicle 401. When the vehicle 401 reaches the intersection, the system 110 becomes activated. The system 110 captures live intersection traffic data from the display screen 400, when the vehicle 401 approaches the intersection. The live intersection traffic data may be used in accident claims or investigation purposes. In case, the live intersection traffic video data is not used then it may be deleted after a pre-defined time-period, for example, a 3-day time-period.

After the activation, the system 110 projects traffic signals as well as the live traffic data on the display screen 400 of the vehicle 401. The display screen 400 is depicted to include sections, section 403a and section 403b. The section 403a is a display area for projecting traffic signals for a vehicle, such as vehicle 401 shown in FIG. 4A. The section 403b is a display area for projecting live movement of the vehicle 401, as well as other active vehicles around the vehicle 401. The active vehicles correspond to those vehicles that are actively connected with the system 110. The system 110 may also display non-active vehicles, such as vehicles 405 and 407. The non-active vehicles include those vehicles that are not connected to the system 110.

The vehicle 401 commutes the lanes based on the traffic signals projected at the section 403a. The vehicle 401 may go straight or take diversions in left or right directions as indicated in the section 403b, while the non-active vehicles 405 and 407 remain halted. In case, a non-active vehicle attempts to violate traffic instructions of the system 110, then the non-active vehicle may face a penalty. For example, a vehicle operator of the vehicle may be required to pay a higher insurance premium upon investigation. The vehicle operator that violated the traffic instructions may be identified as reckless drivers by the system 110. The system 110 may identify such reckless drivers using the geo-fence coordinates of the intersection. An alert notification may be sent to the reckless drivers from the system 110. In an example scenario, the system 110 may report a concerned authority to issue a ticket against the reckless driver for traffic violation investigation as well as for disregarding usage of the system 110.

The vehicle 401 may proceed until the traffic signals change after a time interval. For example, the traffic signals displayed at section 403a may change into yellow signals indicating a yield signal, which is shown in FIG. 4B. Further, the traffic signals projected at the section 403a may be updated to a red signal, which is shown in FIG. 4C. In FIG. 4C, the vehicle 401 and other vehicles around the vehicle 401 in present lane of the vehicle 401, i.e., lane 409 come to a halt according to the traffic signals projected in the section 403b.

The system 110 may be embodied as a cloud-based service or within a cloud-based platform. The detailed description of the system 110 for navigating a vehicle at intersections, while seamlessly providing the traffic signals to users, is further detailed next with reference to FIG. 5.

Figure 5:
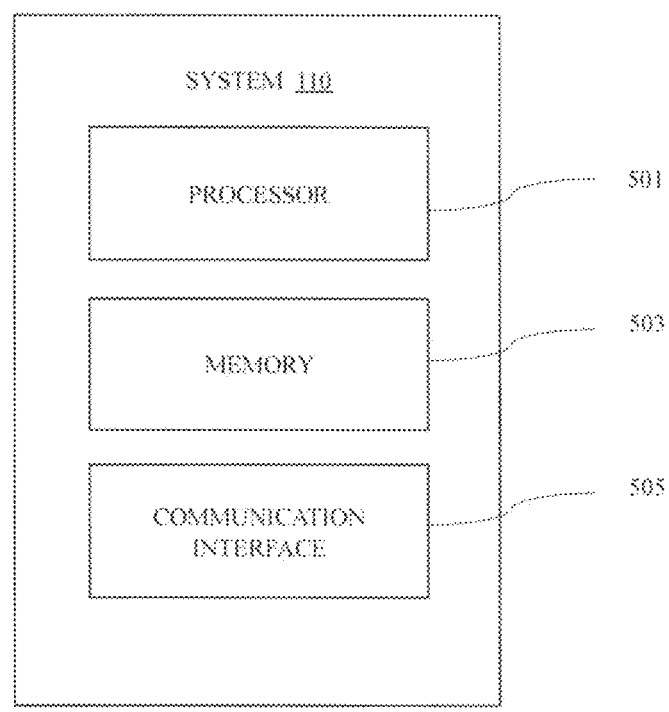
FIG. 5 illustrates a block diagram of the system for navigating a vehicle in an area having an intersection, in accordance with an example embodiment.

FIG. 5 illustrates a block diagram of the system 110 for navigating a vehicle in an area having an intersection, in accordance with an example embodiment. The system 110 may comprise a processing means such as processor 501, storage means such as memory 503, and a communication means such as communication interface 505. The processor 501 may retrieve computer program code instructions that may be stored in the memory 503 for execution of the computer program code instructions.

The processor 501 may be embodied in a number of different ways. For example, the processor 501 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 501 may include one or more processing cores configured to perform independently. A multi-core processor may enable multiprocessing within a single physical package. Additionally or alternatively, the processor 501 may include one or more processors configured in tandem via the bus to enable independent execution of instructions, pipelining and/or multithreading. Additionally or alternatively, the processor 501 may include one or more processors capable of processing large volumes of workloads and operations to provide support for big data analysis. In an example embodiment, the processor 501 may be in communication with a memory 503 via a bus for passing information among components of the system 110.

The memory 503 may be non-transitory and may include, for example, one or more volatile and/or non-volatile memories. In other words, for example, the memory 503 may be an electronic storage device (for example, a computer readable storage medium) comprising gates configured to store data (for example, bits) that may be retrievable by a machine (for example, a computing device like the processor 401). The memory 503 may be configured to store information, data, content, applications, instructions, or the like, for enabling the apparatus to carry out various functions in accordance with an example embodiment of the present invention. For example, the memory 503 could be configured to buffer input data for processing by the processor 501. As exemplarily illustrated in FIG. 5, the memory 503 may be configured to store instructions for execution by the processor 501. As such, whether configured by hardware or software methods, or by a combination thereof, the processor 501 may represent an entity (for example, physically embodied in circuitry) capable of performing operations according to an embodiment of the present invention while configured accordingly. Thus, for example, when the processor 501 is embodied as an ASIC, FPGA or the like, the processor 501 may be specifically configured hardware for conducting the operations described herein. Alternatively, as another example, when the processor 501 is embodied as an executor of software instructions, the instructions may specifically configure the processor 501 to perform the algorithms and/or operations described herein when the instructions are executed. However, in some cases, the processor

501 may be a processor specific device (for example, a mobile terminal or a fixed computing device) configured to employ an embodiment of the present invention by further configuration of the processor 501 by instructions for performing the algorithms and/or operations described herein. The processor 501 may include, among other things, a clock, an arithmetic logic unit (ALU) and logic gates configured to support operation of the processor 501.

The communication interface 505 may comprise input interface and output interface for supporting communications to and from any component with which the system 110 may communicate. The communication interface 505 may be any means such as a device or circuitry embodied in either hardware or a combination of hardware and software that is configured to receive and/or transmit data to/from a communications device. In this regard, the communication interface 505 may include, for example, an antenna (or multiple antennae) and supporting hardware and/or software for enabling communications with a wireless communication network. Additionally or alternatively, the communication interface 505 may include the circuitry for interacting with the antenna(s) to cause transmission of signals via the antenna(s) or to handle receipt of signals received via the antenna(s). In some environments, the communication interface 505 may alternatively or additionally support wired communication. As such, for example, the communication interface 505 may include a communication modem and/or other hardware and/or software for supporting communication via cable, digital subscriber line (DSL), universal serial bus (USB) or other mechanisms.

The processor 501 is configured to receive a live stream of data corresponding to traffic via the communication interface 505 from a third-party, such as the traffic control system 113 of FIG. 1. The live traffic data may include live regional weather radar tracking data and power outages per region that are gathered by the traffic control system 113. The processor 501 determines those traffic signals at intersections (e.g., a 3-way or a 4-way intersection) that are malfunctioning based on the live traffic data. Further, the processor 501 defines geo-fences for each intersection.

Figure 6:
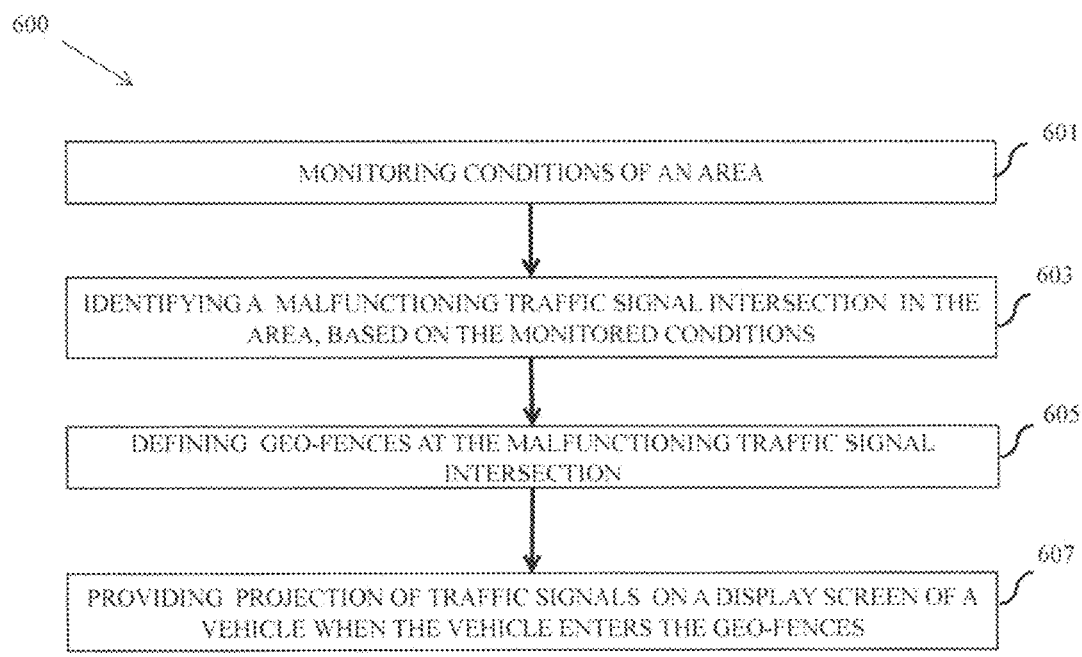
FIG. 6 illustrates a flowchart for implementation of an exemplary method to provide seamless traffic signals to users for navigating a vehicle in an area having an intersection with a malfunctioning traffic signal, in accordance with an example embodiment.

FIG. 6 illustrates a flowchart 600 for implementation of an exemplary method to provide seamless traffic signals to users for navigating a vehicle in an area having an intersection with a malfunctioning traffic signal, in accordance with an example embodiment. It will be understood that each block of the flowchart 600 and combination of blocks in the flowchart 600 may be implemented by various means, such as hardware, firmware, processor, circuitry, and/or other communication devices associated with execution of software including one or more computer program instructions. In some embodiments, the method illustrated in flowchart 600 may be implemented in a display screen (e.g., the display screen 200, the display screen 300 or the display screen 400). In various embodiments, the system 110 implementing the method may be powered by one or more power sources such as vehicle's battery, solar energy, a dynamo, a generator or any suitable power source.

In various embodiments, a system 110 implementing the method illustrated in flowchart 600 may be equipped in a vehicle (e.g., the vehicle 105 or the vehicle 107). The system 110 may be configured to navigate the vehicle at the intersection 101 on implementing the method illustrated in flowchart 600. According to some embodiments, the system 110 may navigate the vehicle autonomously based on a self-learning, adaptive Artificial Intelligence (AI) algorithm. In some example embodiments, programming instructions corresponding to the self-learning and adaptive AI algorithm may be embodied in the memory 503 of the system 110.

At block 601, the method may include monitoring conditions of an area. The conditions may correspond to weather conditions, or power outage of the area. In various embodiments, the area may be indicative of geographical region covering few kilometers. For example, the area may include but not limited to, a city region, a suburban region, a highway region, a railway crossover region, or a combination of aforementioned regions. In various embodiments, weather conditions of the area may be continuously monitored to determine whether the area is subjected to inclement weather. To this end, it may be determined whether an atmosphere of the area has changed from pleasant/normal conditions to unpleasant/adverse conditions. The weather conditions may become unpleasant due to various factors such as rainfall, snowfall, and natural disasters. Consequently, the unpleasant weather conditions may lead to power outages or other unwanted situations that may hinder proper functioning of the traffic signals.

At block 603, the method may include identifying a malfunctioning traffic signal intersection (e.g., the traffic signal 103 of FIG. 1) in the area, based on the monitored weather conditions. The term intersection may refer to an intersection of a plurality of road segments. In various embodiments, the intersection may correspond to traffic intersection (i.e., 3-way intersection or 4-way intersection) with malfunctioning traffic signals. The system 110 may implement the method 600 for any number of intersections with malfunctioning traffic signals. The traffic signals of the intersection may malfunction due to the unpleasant weather conditions, natural calamity, or any other reason such as on being damaged or the power outages. For example, the power outages may lead to short of power (i.e. electric current) to be supplied, or damage to electric grids. According to some embodiments, the intersection may correspond to traffic intersection (i.e. 3-way intersection or 4-way intersection) with hazardous visibility for a user (e.g., the rider 109 of the vehicle 105 or the vehicle 107). For instance, the visibility of the intersection may be poor due to a severe snowfall, gusty winds or a heavy downpour. This may lead to hazardous conditions, such as vehicle accidents or mass collision of commuters. I At block 605, the method may include defining geo-fences (i.e., virtual coordinates) at the malfunctioning traffic signal intersection. In various embodiments, the geo-fences provide a coverage range of the traffic signal intersection along with the functionality of navigating universal vehicles for a time interval. In various embodiments, the coverage range may be virtual polygon (such as a circle) with location of the intersection as a center of the circle and a radius based on a threshold distance from the center. In an example embodiment, the threshold distance may be a configurable value, a default value or a preset distance for the intersection. In various embodiments, the virtual coordinates may have flexible units such as the position of an origin, directions of coordinates, and scales of coordinates. For example, the virtual coordinates may be GPS latitude and longitude values.

At block 607, the method may include providing projection of traffic signals on a display screen of a vehicle, when the vehicle enters the geo-fences. The projection of the traffic signals is explained in detail in FIGS. 2A and 2B, FIGS. 3A-3F and FIGS. 4A-4C. Additionally or alternatively, an audio output for the traffic signals may be provided to users for ease of use.

In some example embodiments, the system 110 may be embodied within the electronic device 111. Such an electronic device may also be embodied in a vehicle for projecting the traffic signals and enabling the navigation. The electronic device 111 is further described in FIG. 7.

Figure 7:
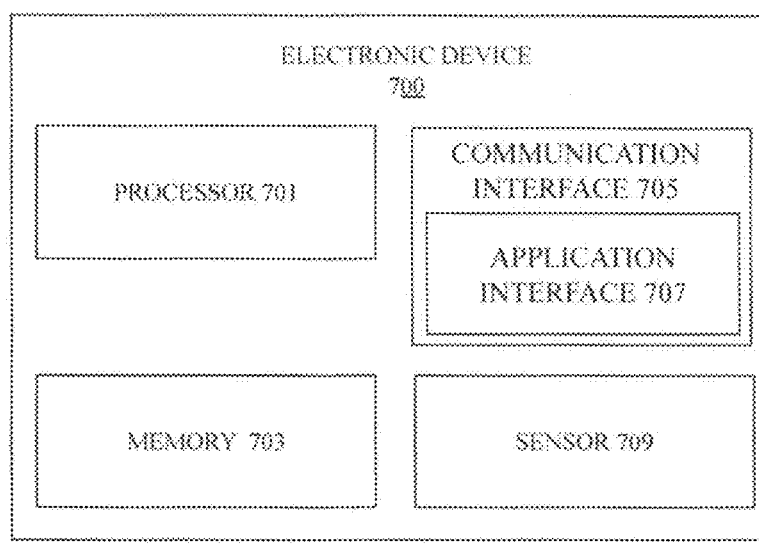
FIG. 7 illustrates a block diagram of an electronic device capable of implementing some example embodiments of the present disclosure.

FIG. 7 illustrates a block diagram of an electronic device 700 capable of implementing some example embodiments of the present disclosure. The electronic device 700 may include one or more processors, such as a processor 701 that is communicably coupled with a memory 703, a communication interface 705 and a sensor 709. The electronic device 700 is an example of the electronic device 111 of FIG. 1. In an embodiment, the processor 701 may transmit the location data and the speed data via a communication interface 705. In an embodiment, the communication interface 705 includes an application interface 707 that enables transmission and reception of data from the system 110. The electronic device 700 may include one or more sensors 709 (hereinafter, also referred to as sensor 709) for capturing location data and the speed data. Some of the non-limiting examples of the sensor 709 include an accelerometer, a tracking sensor, such as a Global Positioning System (GSP) sensor, a gyroscope, an orientation sensor, and a digital compass. Further, the application interface 707 projects traffic signal information provided by the system 110.

The processor 701 may be a processor specific device (for example, a mobile terminal or a fixed computing device) configured to employ an embodiment of the disclosure by further configuration of the processor 701 by instructions for performing the algorithms and/or operations described herein.

The processor 701 may comprise suitable logic, circuitry, and interfaces that may be configured to execute instructions stored in the memory 703. The processor 701 may be embodied in a number of different ways. For example, the processor 701 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 701 may include one or more processing cores configured to perform independently. The processor 701 may be configured to transmit location data and speed data of a vehicle associated with the electronic device 700.

Examples of the processor 701 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. As such, in some embodiments, the processor 201 may include one or more processing cores configured to perform independently. A multi-core processor may enable multiprocessing within a single physical package.

The memory 703 may comprise suitable logic, circuitry, and interfaces that may be configured to store a machine code and/or instructions executable by the processor 701. The memory 703 may be non-transitory and may include, for example, one or more volatile and/or non-volatile memories. For example, the memory 703 may be an electronic storage device (for example, a computer readable storage medium) comprising gates configured to store data (for example, bits) that may be retrievable by a machine (for example, a computing device like the processor 701). The memory 703 may be configured to store information, data, content, applications, instructions, or the like, for enabling the apparatus to carry out various functions in accordance with an example embodiment of the present invention. Examples of implementation of the memory 703 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The communication interface 705 may comprise input interface and output interface for supporting communications to and from the electronic device 700. The communication interface 705 may be any means such as a device or circuitry embodied in either hardware or a combination of hardware and software that is configured to receive and/or transmit data to/from the electronic device 700 to the system 110. In this regard, the communication interface 705 may include, for example, an antenna (or multiple antennae) and supporting hardware and/or software for enabling communications with a wireless communication network. Additionally or alternatively, the communication interface 705 may include the circuitry for interacting with the antenna(s) to cause transmission of signals via the antenna(s) or to handle receipt of signals received via the antenna(s). In some environments, the communication interface 705 may alternatively or additionally support wired communication. As such, for example, the communication interface 705 may include a communication modem and/or other hardware and/or software for supporting communication via cable, digital subscriber line (DSL), universal serial bus (USB) or other mechanisms.

According to some embodiments, the traffic signal information may include a message indicating road stop marker, when visibility of an intersection is poor. For example, the road stop marker notification may be generated, if the snow covers the range of three feet.

According to some embodiments, vehicle's user activities may be monitored by the system 110. For example, the user activities, such as live recording of traffic intersection are monitored to determine whether the vehicle adheres to the traffic signal information of the system 110. For example, if the signal at an intersection is a stop signal and the user still proceeds at stop signal (i.e., without stopping), then an alert notification is sent to the user. The alert notification may be displayed on the application interface 707. In various embodiments, the alert notification may include a message indicating a fine (i.e., a violation fee) for not-adhering to the traffic signal instruction.

According to some embodiments, the live intersection traffic data may be captured in a video format or an image format. In various embodiments, the captured video traffic data of the user may be used for validating the alert notification at times of investigation or insurance claims.

According to some example embodiments, a control signal for operating the vehicle in semi-autonomous or autonomous manner, based on the traffic signal information. For example, if the signal at the intersection is stop signal, then the control signal may be generated to stop the vehicle. In some example embodiments, the generated control signal may override any other drive control signal/action of the vehicle.

In this way, the described embodiments may be utilized for providing seamless traffic signal information to users that enable navigating vehicles at/around intersections, in an efficient and feasible manner. The traffic signal information are projected in an automated manner, without having the need of a user to activate the system 110 manually. The system 110 is activated, when the user enters a geo-fence defined by the system 110 around a malfunctioning traffic signal. The system 110 projects traffic signals on a display screen along with a timer value. Further, an audio output of the traffic signal information may be generated, thereby, allowing the user to focus on the road and commute with ease. In a real-time scenario, when there is severe malfunctioning of traffic signals, the system 110 operates in an automated manner, without having any need of manual intervention. This overcomes delay in recovery time for repairing malfunctioning traffic signals. Thus, the system 110 provides seamless traffic signal information and assistance in smooth navigation to users.

Many modifications and other embodiments of the inventions set forth herein will come to mind of one skilled in the art to which these inventions pertain having the benefit of the teachings presented in the foregoing descriptions and the associated drawing. Therefore, it is to be understood that the inventions are not to be limited to the specific embodiments disclosed and that modifications and other embodiments are intended to be included within the scope of the present disclosure. Moreover, although the foregoing descriptions and the associated drawing describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the present disclosure. Although specific terms are employed herein, they are used in a generic and descriptive sense only and not for purposes of limitation.

We claim:

1. A system for navigating a vehicle at an intersection with a malfunctioning traffic signal a location comprising:
    a geofence extending a distance outwardly from said intersection location;
    an electronic device associated with the vehicle, said electronic device comprising:
        a processor communicably coupled with a memory;
        a communication interface for projecting traffic signal information provided by the system and for transmitting and receiving location and speed data, wherein said communication interface includes means for displaying virtual traffic signals corresponding to traffic signals that would normally be displayed on the malfunctioning traffic signal; and
        a sensor for capturing location data and speed, said sensor being communicably coupled to said processor and said communication interface;
    a system for providing navigation assistance to said electronic device; and
    a network connecting said system to said electronic device, said network communicating information that would normally be displayed on the malfunctioning traffic signal to the electronic device for display as the virtual traffic signals.

2. The system for navigating a vehicle according to claim 1 wherein the electronic device is integrated within the vehicle.

3. The system for navigating a vehicle according to claim 2 wherein a display of the electronic device is integrated into the rearview mirror of the vehicle.

4. The system for navigating a vehicle according to claim 1 wherein the electronic device is a handheld mobile device.

5. The system for navigating a vehicle according to claim 4 wherein the handheld mobile device is selected from a group consisting of a smartphone, a tablet, a phablet, and a wearable device.

6. The system for navigating a vehicle according to claim 1 wherein the system for providing navigation assistance comprises a navigation application that is installed on the electronic device.

7. The system for navigating a vehicle according to claim 6 wherein the navigation application provides communication between a plurality of vehicles carrying said electronic device.

8. The system for navigating a vehicle according to claim 1 wherein the network is associated with an application layer for implementation of communication protocols based on one or more communication requests from at least one of the one or more communication devices, and communication data is transmitted or received via the communication protocols.

9. The system for navigating a vehicle according to claim 8 wherein said communication protocols are wired or wireless, and are selected from a group consisting of Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

10. The system for navigating a vehicle according to claim 1 wherein the network is a wireless channel, a wired channel, or a combination of wireless and wired channel.

11. The system for navigating a vehicle according to claim 10 wherein the wireless or wired channel may be associated with a network standard selected from a group consisting of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN).

12. The system for navigating a vehicle according to claim 1 wherein the means for displaying comprises a display screen upon which virtual traffic signals corresponding to lanes of traffic at the intersection are displayed.

13. The system for navigating a vehicle according to claim 1 further comprising a power saving mode wherein the electronic device remains in low power mode until it enters into the geofence, at which time it enters full power mode.

14. The system for navigating a vehicle according to claim 12 wherein the display comprises a split-screen wherein live traffic data is displayed on a first section of the screen and traffic signal data is provided on a second section of the screen.

15. A method for navigating a vehicle in an area having one or more intersections including the steps of:
    monitoring conditions in the area at the one or more intersections;
    identifying a malfunctioning traffic signal at a one of the one or more intersections based on the monitored condition;
    defining a geofence in the area of the identified malfunctioning traffic signal;

transmitting signal information corresponding to traffic signals that would normally be displayed on the malfunctioning traffic signal from a source to an electronic device in a vehicle via a network;

providing virtual traffic signals corresponding to the traffic signals that would normally be displayed on the malfunctioning traffic signal on a display screen of the electronic device when the vehicle enters the geofence.

16. The method for navigating a vehicle at an intersection according to claim 15, wherein the step of monitoring conditions in the area of the intersection includes monitoring weather conditions and power outages.

17. The method for navigating a vehicle at an intersection according to claim 16, wherein the step of monitoring conditions in the area of the intersection includes collecting crowd-sourced traffic data.

18. The method for navigating a vehicle at an intersection according to claim 15, wherein the step of defining a geofence includes providing a coverage range of the traffic signal intersection along with the functionality of navigating universal vehicles for a time interval.

19. The method for navigating a vehicle at an intersection according to claim 18, wherein the coverage range is a virtual circle with location of the intersection at a center of the circle and a radius based on a threshold distance from the center.

* * * * *